(12) United States Patent
Krammer (10) Patent No.: US 10,427,531 B2
(45) Date of Patent: Oct. 1, 2019

(54) SCALABLE INDUCTIVE CHARGING STATION

(71) Applicant: Bayerische Motoren Werke Aktiengesellschaft, Munich (DE)

(72) Inventor: Josef Krammer, Holzkirchen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 98 days.

(21) Appl. No.: 15/331,171

(22) Filed: Oct. 21, 2016

(65) Prior Publication Data

US 2017/0036553 A1 Feb. 9, 2017

Related U.S. Application Data

(63) Continuation of application No. PCT/EP2015/052623, filed on Feb. 9, 2015.

(30) Foreign Application Priority Data

Apr. 24, 2014 (DE) .................. 10 2014 207 719

(51) Int. Cl.
*H02J 7/00* (2006.01)
*B60L 11/18* (2006.01)
(Continued)

(52) U.S. Cl.
CPC ............. *B60L 11/182* (2013.01); *B60L 50/52* (2019.02); *B60L 53/12* (2019.02); *B60L 53/20* (2019.02);
(Continued)

(58) Field of Classification Search
CPC ........ H02J 7/025; H01F 38/14; Y02T 90/122; B60L 11/182; Y02E 60/12
(Continued)

(56) References Cited

U.S. PATENT DOCUMENTS

| 5,594,318 A | 1/1997 | Nor et al. |
| 2009/0109717 A1* | 4/2009 | Ryu ............... H02M 1/4225 363/126 |

(Continued)

FOREIGN PATENT DOCUMENTS

| DE | 696 02 739 T2 | 10/1999 |
| FR | 2 981 521 A1 | 4/2013 |
| WO | WO 2011/127455 A2 | 10/2011 |

OTHER PUBLICATIONS

International Search Report (PCT/ISA/210) issued in PCT Application No. PCT/EP2015/052623 dated Jun. 8, 2015, with English translation (six (6) pages).
(Continued)

*Primary Examiner* — Arun C Williams
(74) *Attorney, Agent, or Firm* — Crowell & Moring LLP (57) ABSTRACT

An inductive charging system is provided for a vehicle. A floor unit is designed to generate an electromagnetic charging field for transmitting electrical energy to the vehicle. The floor unit has a first interface which is designed to receive electrical energy in the form of a direct current at the floor unit. The floor unit further has an alternating current generator which is designed to convert the direct current into an alternating current. The floor unit also has a primary coil which is designed to generate the electromagnetic charging field on the basis of the alternating current.

15 Claims, 4 Drawing Sheets

(51) Int. Cl.
    *H02J 7/02*         (2016.01)
    *B60L 50/52*      (2019.01)
    *B60L 53/20*      (2019.01)
    *B60L 53/12*      (2019.01)
    *B60L 53/30*      (2019.01)
    *B60L 53/65*      (2019.01)

(52) U.S. Cl.
CPC ............. *B60L 53/30* (2019.02); *B60L 53/305* (2019.02); *B60L 53/65* (2019.02); *H02J 7/0021* (2013.01); *H02J 7/025* (2013.01); *B60L 2200/12* (2013.01); *B60L 2200/36* (2013.01); *B60L 2210/30* (2013.01); *B60L 2240/36* (2013.01); *B60L 2270/147* (2013.01); *H02J 2007/0096* (2013.01); *Y02T 10/7005* (2013.01); *Y02T 10/7072* (2013.01); *Y02T 10/7241* (2013.01); *Y02T 90/121* (2013.01); *Y02T 90/122* (2013.01); *Y02T 90/127* (2013.01); *Y02T 90/128* (2013.01); *Y02T 90/14* (2013.01); *Y02T 90/163* (2013.01); *Y02T 90/169* (2013.01); *Y04S 30/14* (2013.01)

(58) Field of Classification Search
USPC ........................................................ 320/108
See application file for complete search history.

(56) References Cited

U.S. PATENT DOCUMENTS

| 2010/0109445 | A1* | 5/2010 | Kurs ................... B60L 11/007 307/104 |
| 2011/0254377 | A1* | 10/2011 | Wildmer .............. B60L 11/182 307/104 |
| 2011/0285349 | A1 | 11/2011 | Widmer et al. |
| 2012/0109519 | A1* | 5/2012 | Uyeki ..................... B60L 7/14 701/439 |
| 2013/0029595 | A1 | 1/2013 | Widmer et al. |
| 2013/0187602 | A1* | 7/2013 | Bouman ............. B60L 11/1811 320/109 |
| 2014/0320090 | A1 | 10/2014 | Keeling et al. |

OTHER PUBLICATIONS

German Search Report issued in counterpart German Application No. 10 2014 207 719.2 dated Jan. 19, 2015, with partial English translation (fifteen (15) pages).

"Das bringt eine groessere Flexibilitaet", http://www.automobil-industrie.vogel.de/zulleferer/articles/424400/, Nov. 11, 2013 (four (4) pages).

Chinese Office Action issued in Chinese counterpart application No. 201580020883.5 dated Mar. 8, 2019 (Eight (8) pages).

* cited by examiner

SCALABLE INDUCTIVE CHARGING STATION

CROSS REFERENCE TO RELATED APPLICATIONS

This application is a continuation of PCT International Application No. PCT/EP2015/052623, filed Feb. 9, 2015, which claims priority under 35 U.S.C. § 119 from German Patent Application No. 10 2014 207 719.2, filed Apr. 24, 2014, the entire disclosures of which are herein expressly incorporated by reference.

BACKGROUND AND SUMMARY OF THE INVENTION

The invention relates to an inductive charging system for a vehicle. Specifically, the invention relates to the design of an inductive charging station.

Vehicles with an electric drive system are typically equipped with a battery, in which electrical energy for the operation of an electric motor of the vehicle can be stored. The vehicle battery can be charged using electrical energy from an power supply network. To this end, the battery is coupled to the power supply network, such that the electrical energy is transmitted from the power supply network to the vehicle battery. The coupling can be effected by hard-wiring (using a charging cable) and/or wirelessly (by way of inductive coupling between a charging station and the vehicle).

Figure 1:
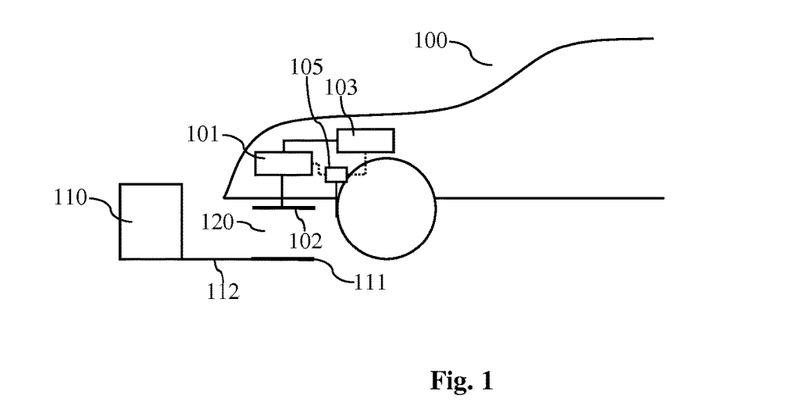
FIG. 1 is a schematic diagram of an exemplary system for the inductive charging of an electrical energy store in a vehicle.

One approach to the automatic and wireless inductive charging of the vehicle battery is that electrical energy is transmitted to the battery by magnetic induction from the ground surface to the underbody of the vehicle via the underbody space 120. An exemplary representation is shown in FIG. 1. Specifically, FIG. 1 represents a vehicle 100 with a store 103 for electrical energy (e.g. with a chargeable battery 103). The vehicle 100 incorporates a "secondary coil" in the vehicle underbody, wherein the secondary coil is connected to the store 103 via an unrepresented impedance adaptor and a rectifier 101. The secondary coil is typically a component of a "Wireless Power Transfer" (WPT) vehicle unit 102.

The secondary coil of the WPT vehicle unit 102 can be positioned above a primary coil, wherein the primary coil is arranged e.g. on the floor of a garage. The primary coil is typically a component of a "WPT floor unit" 111. The primary coil is connected to a power supply 110 (in the present document, designated as a charging unit 110). The power supply 110 can include a radio-frequency generator, which generates an AC (alternating current) in the primary coil of the WPT floor unit 111, whereby a magnetic field is induced. In the present document, this magnetic field is designated as an electromagnetic charging field. The electromagnetic charging field can exhibit a predefined charging field frequency range. The charging field frequency range may lie within a frequency range of e.g. 80-90 kHz (specifically 85 kHz).

In the event of adequate magnetic coupling between the primary coil of the WPT floor unit 111 and the secondary coil of the WPT vehicle unit 102, the magnetic field induces a corresponding voltage, and thus a current, in the secondary coil via the underbody space 120. The current induced in the secondary coil of the WPT vehicle unit 102 is rectified by the rectifier 101 and is stored in the energy store 103 (e.g. in the battery). Accordingly, electrical energy can be transmitted wirelessly from the power supply 110 to the energy store 103 of the vehicle 100. The charging process can be controlled in the vehicle 100 by a charging control device 105 (also designated as the WPT control device 105). To this end, the charging control device 105 can be designed for communication, e.g. wirelessly, with the charging unit 110 (e.g. with a wallbox).

As a result of the limited underbody space 120, the potential dimensions of a WPT floor unit 111 are typically restricted. The dimensions of the WPT floor unit 111 can be reduced, e.g. by the transfer of certain components from the WPT floor unit 111 to the charging unit 110. However, this arrangement may be associated with higher specifications in respect of a connecting cable 112 between the floor unit 111 and the charging unit 110.

The present document addresses the technical issue of the design of a WPT floor unit 111, by means of which a reduction in the dimensions of the WPT floor unit 111, and a simplification of specifications for the connecting cable 112 between the floor unit 111 and the charging unit 110, can be achieved.

This and other objects are achieved in accordance with embodiments of the present invention. According to a first aspect, a floor unit (specifically a WPT floor unit) is described, which is designed for the generation of an electromagnetic charging field for the transmission of electrical energy to a vehicle (specifically a vehicle with an electric drive system). The vehicle may be a private car, a heavy goods vehicle and/or a motorcycle. The floor unit may be an element of a charging station which, in addition to the floor unit, includes a charging unit (e.g. a wallbox) which is connected to the floor unit by way of a connecting cable.

The floor unit includes a first interface, which is designed for the reception or take-up of electrical energy in the floor unit in the form of a direct current. The connecting cable can particularly be connected to a charging unit via the first interface on the floor unit. Accordingly, the floor unit can be designed for the take-up of a DC (direct current) at an input to the floor unit (i.e. at the first interface).

The floor unit also includes an alternating current generator (designated in the present document as a HF (high-frequency) generator), which is designed for the conversion of direct current into an alternating current. The alternating current is typically at the same frequency as the electromagnetic charging field which is generated by the floor unit. For example, the alternating current may exhibit a frequency of 80-90 kHz (specifically 85 kHz).

The floor unit also includes a primary coil, which is designed for the generation of the electromagnetic charging field from the alternating current.

The floor unit is thus designed for the generation of the electromagnetic charging field on the basis of a direct current at the input to the floor unit. Accordingly, it is possible for direct current to be transmitted from the charging unit via the connecting cable to the floor unit, thereby simplifying specifications for the connecting cable. At the same time, the floor unit incorporates no components for the generation of direct current from an power supply network and/or for Power Factor Correction. These components can be arranged in the charging unit. Accordingly, the floor unit can be configured in as compact a form as possible.

The floor unit can also incorporate a sensor which is designed for the detection of measuring data with respect to a state of the floor unit. For example, a temperature of the floor unit and/or the presence of a foreign body in the vicinity of the floor unit can be detected. Moreover, the floor unit can incorporate a communication unit, which is designed for the transmission of data, based upon measuring data, to the charging unit. As described above, the charging unit can be designed for the delivery of electrical energy to the floor unit in the form of a direct current. Specifically, the charging unit can be designed to deliver electrical energy in accordance with data received.

The communication unit can be designed for the constitution of a wireless communication link (e.g. a WLAN connection) to the charging unit, specifically with a corresponding communication unit in the charging unit. Alternatively or additionally, the communication unit of the floor unit can be designed for the constitution of a Power Line Communication (PLC) link to the charging unit, specifically via the power line of the connecting cable. The connecting cable thus requires no dedicated signal line for the transmission of data from the floor unit to the charging unit (or vice versa). Specifications and costs associated with the connecting cable can be simplified and reduced accordingly.

The floor unit can incorporate a control unit. The control unit can be designed to control the generation of alternating current by the alternating current generator. Specifically, the control unit can be designed for the reception of instructions from the charging unit (via the communication unit of the floor unit). The control unit can then control the generation of alternating current in accordance with the instructions received.

The floor unit can incorporate a second interface (and, where applicable, further interfaces). The second interface can be designed for the routing of electrical energy in the form of a direct current to another floor unit. Accordingly, a plurality of floor units can be connected in series or in a cascade arrangement. This is advantageous, as it permits one charging unit to supply a plurality of floor units. Costs for charging stations with a plurality of parking places can be reduced accordingly.

According to a further aspect, a charging unit for a charging station is disclosed for the wireless transmission of electrical energy to a vehicle. The charging unit incorporates a Power Factor Correction (PFC) unit, which is adapted to electrical energy from a power supply network in order to provide a direct current. The power supply network may deliver an AC (alternating current). The PFC unit can incorporate a rectifier, in order to generate a direct current from the AC current delivered by the power supply network, which direct current can then be delivered to a floor unit via a first interface on the charging unit.

The charging unit also incorporates a first interface, which is designed for the delivery of electrical energy to a floor unit in the form of a direct current. The first interface on the charging unit can be connected to a first interface on the floor unit by way of a connecting cable, in order to transmit electrical energy from the charging unit to the floor unit. The supply of a direct current permits the use of a cost-effective and flexibly-configurable connecting cable. Moreover, by the arrangement of the PFC unit in the charging unit, the size of the floor unit can be reduced. Accordingly, a PFC unit can be used for a plurality of floor units, thereby permitting costs for a charging station with a plurality of parking spaces to be reduced.

The charging unit can incorporate a plurality of interfaces, which are designed to deliver the electrical energy in the form of a direct current to a corresponding plurality of floor units.

As illustrated above, this permits the provision of a cost-effective charging station with a plurality of charging spaces.

The charging unit can incorporate a communication unit, which is designed to communicate with the vehicle and with the floor unit (or, where applicable, with a plurality of floor units). The communication unit can be designed for the constitution of a wireless communication link (e.g. WLAN) and/or a Power Line Communication (PLC) link. Accordingly, dedicated signal lines in the connecting cable can be omitted.

The charging unit can incorporate a control unit, which is designed to control the transmission of electrical energy to the vehicle via the floor unit. To this end, instructions can be transmitted via the communication unit to the one or more floor units.

According to a further aspect, a charging station for the wireless transmission of electrical energy to a vehicle is disclosed. The charging station incorporates a charging unit as described in the present document, which is designed for the delivery of electrical energy in the form of a direct current to a first interface on the charging unit. Moreover, the charging station incorporates at least one floor unit as described in the present document, which is designed for the take-up of the electrical energy in the form of a direct current at a first interface on the floor unit, and the generation therefrom of an electromagnetic charging field for the transmission of electrical energy to the vehicle. The charging station can also include a connecting cable, which is designed for the galvanic connection of the first interface on the charging unit with the first interface on the floor unit.

It should be observed that the methods, devices and systems described in the present document can be applied both in isolation, and in combination with other methods, devices and systems described in the present document. Moreover, any aspects of the method, device and systems described in the present document can be mutually combined in a variety of ways.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 2:
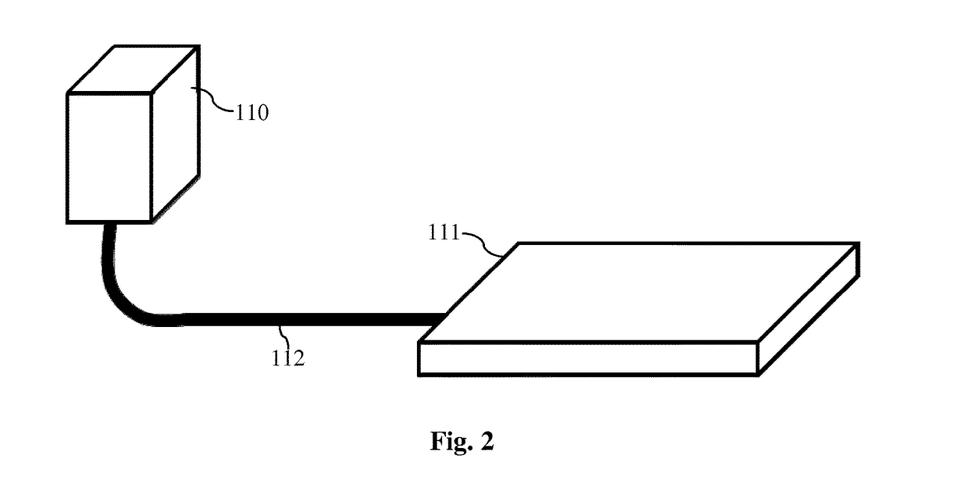
FIG. 2 is a schematic block diagram of an exemplary charging station.

The design of a charging station is described. An exemplary charging station is represented in FIG. 2. A charging station specifically includes a charging unit 110, which is designed to communicate with a vehicle 100 (e.g. via a wireless communication link) and is designed to control the charging process of an electrical energy store 103 on the vehicle 100 via a floor unit 111. The floor unit 111 of the charging station is connected to the charging unit 110 by way of a connecting cable 112. The charging unit 110 is typically connected to an electrical energy supply source (e.g. to an power supply network). The connecting cable 112 is designed for the transmission of electrical energy from the charging unit 110 to the floor unit 111. By way of a primary coil in the floor unit 111, this electrical energy can then be inductively transmitted to the secondary coil in the vehicle unit 102 of the vehicle 100.

As indicated above, a WPT floor unit 111 is advantageously provided, the spatial coverage of which is as small as possible. This permits the use of the floor unit 111 in a flexible manner with different types of vehicles 100, specifically with vehicles 100 which feature a relatively restricted underbody space 120.

Figure 3:
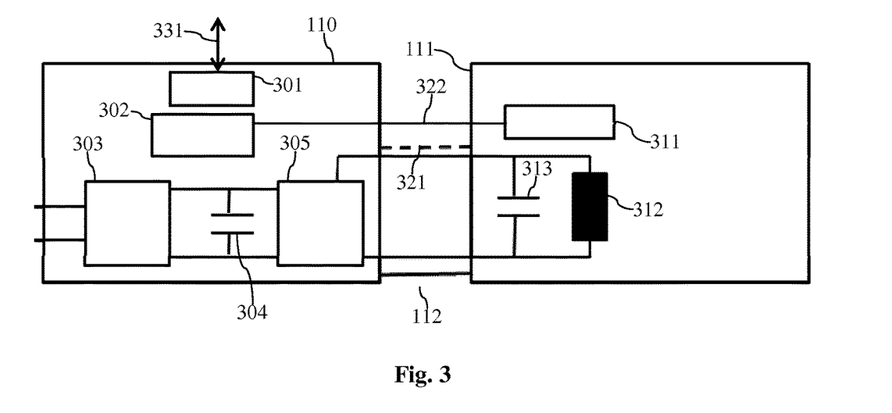
FIG. 3 is a schematic diagram of exemplary components of a charging unit, a connecting cable and a floor unit.

In order to permit the assumption of the smallest possible dimensions by the floor unit 111, a HF generator (also described as an AC generator) 305 can be incorporated in the charging unit 110 for the generation of an alternating current for the charging field, for which no (or reduced) spatial requirements apply. An arrangement of this type is represented in FIG. 3. Specifically, FIG. 3 shows a charging unit 110 which incorporates a Power Factor Correction (PFC) unit 303 with a rectifier, wherein the rectifier is designed to generate a direct current from an alternating current (e.g. from the power supply network). The charging unit 110 also includes an intermediate circuit capacitor 304, which is designed for the smoothing of the direct current generated. The HF generator 305 is designed for the generation of an alternating current from the direct current, for the generation of the charging field. The frequency of the alternating current typically corresponds to the frequency of the charging field (e.g. 85 kHz). The charging unit 110 from FIG. 3 also includes a control unit 302 which is designed for the control of the charging process (specifically for the generation of the alternating current required for the generation of the charging field). To this end, the control unit 302 can receive measuring data via a signal line 322 from one or more sensors 311 on the floor unit 311. By means of the one or more sensors 311, it can e.g. be detected that the secondary coil of a vehicle 100 is positioned above the floor unit 111.

The charging unit 110 moreover includes a communication unit 301, which is designed to communicate with a vehicle 100, e.g. by use of a wireless communication link 331 (for example, wireless LAN). Specifically, by way of the communication unit 301, a charging process for a vehicle 100 can be initiated.

The floor unit 111 represented in FIG. 3, in addition to the one or more sensors 311, also incorporates the primary coil 312 for the generation of the charging field from the alternating current generated by the HF generator 305. Moreover, the floor unit 111 typically includes a resonance capacitor 313 (specifically for the provision of a LC oscillator circuit). As described above, the one or more sensors 311 can be designed to detect the presence of the secondary coil of a vehicle 100. Alternatively or additionally, the one or more sensors 311 can be designed to detect the presence of foreign bodies in the vicinity of the floor unit 111 and/or to record the temperature of the floor unit 111.

In the charging station represented in FIG. 3, an alternating current is transmitted via the connecting cable 112 from the charging unit 110 to the floor unit 111. The transmission of an alternating current typically requires the use of a HF line with an electromagnetic shield 321. Moreover, the transmission of measuring data from the one or more sensors 311 to the control unit 302 requires the use of a signal line 322. Overall, specifications for the cable link 112 between the charging unit 110 and the floor unit 112 are thus relatively stringent and complex. Moreover, the selection of the length of the cable link 112 is typically restricted by the transmission of a HF alternating current.

For the charging station represented in FIG. 3, the cable link between the charging unit 110 and the floor unit 111 is thus relatively complex, as the use of "high-frequency litz wires" is typically required for the purposes of high-frequency (HF) transmission to supply the coil 312. Typically, these wires also need to be configured in a water-tight and shielded arrangement. The preparation of a connecting cable 112 of this type (specifically the plug-in connector) is a complicated process.

In addition to the power supply to the primary coil 312, the transmission of a high volume of signals is required, either in the connecting cable 112 or in a separate parallel cable. This further increases the complexity of the connection between the charging unit 110 and the floor unit 111.

A further disadvantage of the charging station 110, 112, 111 represented in FIG. 3 is that a complete charging station (i.e. in each case, a standalone pairing of a charging unit 110 and floor unit 111) is required for each charging berth. If the electric vehicle owner has a number of parking spaces (e.g. inside a garage and in front of a garage) which they use for parking on an alternating basis, the vehicle owner will require two complete charging stations, even though only one charging station will be used at any time.

Figure 4:
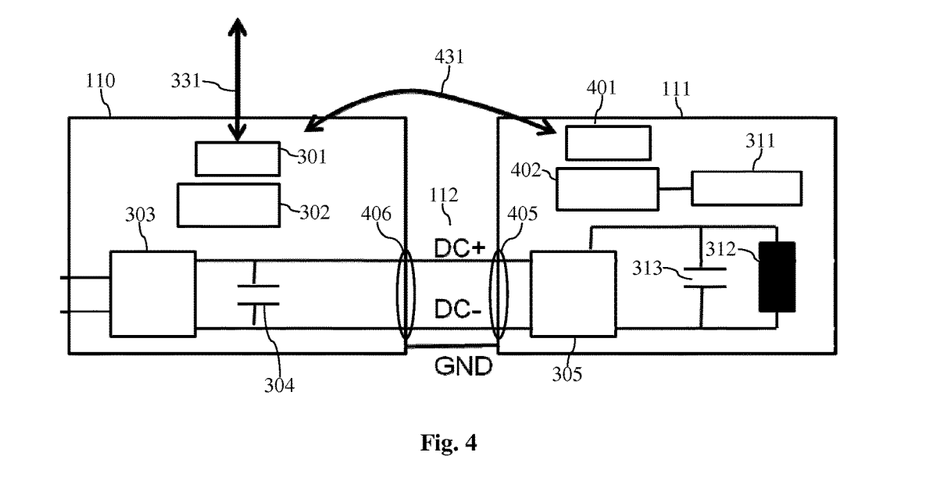
FIG. 4 is a schematic diagram of an improved design of a charging unit, a connecting cable and a floor unit.

In light of the above-mentioned disadvantages of the design shown in FIG. 3, in accordance with an embodiment of the invention the HF generator 305 is integrated in the floor unit 111. A design of this type is represented in FIG. 4. The floor unit 111 represented in FIG. 4 incorporates the HF generator 305. This has the advantage that a direct current is transmitted via the connecting cable 112, such that specifications for the connecting cable 112 are simplified accordingly. The floor unit 111 can thus take up electrical energy in the form of a direct current via an interface 405. The interface 405 can be configured with a plug connector or a socket. The connecting cable 112 can thus be connected to the floor unit 111 by way of a plug-in connection. Correspondingly, the charging unit 110 can also be provided with an interface 406, to which electrical energy is delivered in the form of a direct current.

Moreover, the floor unit 111 can incorporate a dedicated control unit 402, which is designed for the reception and, where applicable, evaluation of measuring data from the one or more sensors 311. Measuring data and/or evaluated data can be communicated to the charging unit 110 by way of a communication unit 401 on the floor unit 111. Specifically, the communication unit 301 of the charging unit 110 can be designed to communicate with the communication unit 401 of the floor unit 111 via a wireless communication link (e.g. wireless LAN). A wireless communication link provides an appropriate means of communication between the charging unit 110 (e.g. a wallbox) and the floor unit 111, on the grounds that a wireless communication link is already used in the charging unit 110 for communication with the vehicle 100. Thus, in lieu of two communication nodes (i.e. the charging unit 110 and the vehicle 100), the wireless communication channel additionally serves the floor unit 111. By the use of a dedicated control unit 402 and communication unit 401 for the floor unit 111, a signal line 322 in the connecting cable 112 can be omitted. Moreover, the use of a dedicated control unit 402 in the floor unit 111 permits the simplification of the control unit 302 of the charging unit 110.

In other words, it is provided that the function of the charging unit 110 should be at least partially transferred to the floor unit 111. Specifications for the connecting cable 112 to the charging unit 110 can be simplified accordingly. In the charging unit 110, a mains alternating current is converted into direct current. This occurs in the PFC unit 303 and/or in the rectifier 303. The PFC unit 303 is typically required in the form of a sub-circuit, in the interests of compliance with network connection requirements. Direct current is used for the purposes of transmission between the charging unit 110 and the floor unit 111. In the floor unit 111, direct current is converted into the high-frequency alternating current which is required for the purposes of inductive transmission.

The transmission of signals (i.e. control signals and/or measuring data) between the charging unit 110 and the floor unit 111 can be effected by use of an appropriate communication medium 431. Examples of appropriate communication media 431 include a CAN-bus, Ethernet, PLC (Power Line Communication) via the DC supply of the connecting cable 112 and/or WLAN (e.g. of the type employed for the communication link between the vehicle 100 and the charging unit 110).

Figure 5A:
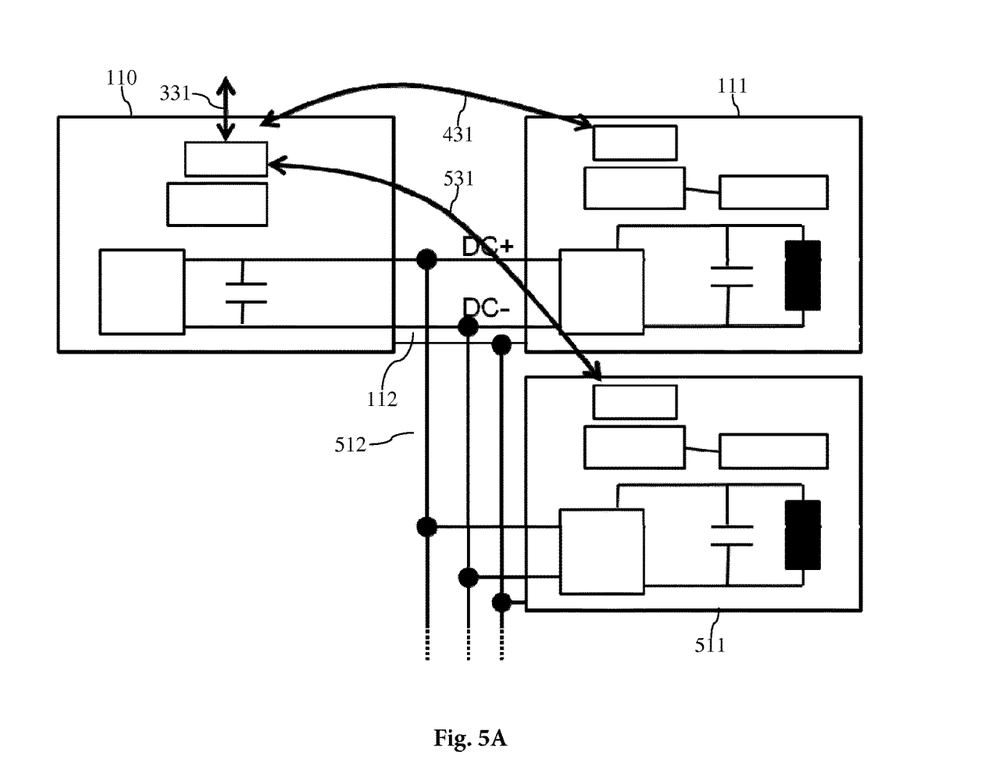
FIG. 5A is a schematic diagram of an exemplary parallel circuit of a plurality of floor units.

The charging unit 110 can incorporate connections or interfaces 406 for a plurality of floor units 111. This is represented for exemplary purposes in FIGS. 5a and 5b. Both the direct current supply and the communication medium can be connected in parallel, such that a single charging unit 110, with no additional electronics, can be used to supply a plurality of floor units 111, 511. FIG. 5a shows the parallel supply lines 112, 512 and the parallel communication channels 431, 531.

Figure 5B:
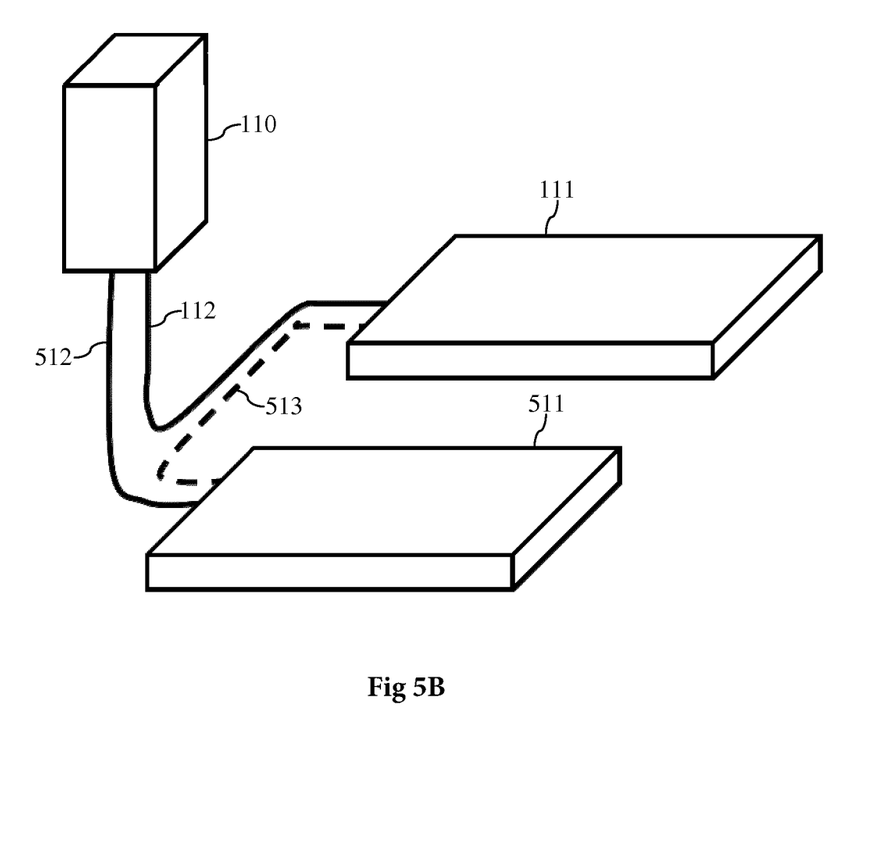
FIG. 5B is a schematic block diagram of an exemplary parallel circuit and/or cascade arrangement of floor units.

It is hereby observed that the simultaneous charging of a plurality of vehicles 100 on the connected floor units 111, 511 is typically limited by the capacity of the charging unit 110 (specifically of the PFC unit 303) which is delivered by the corresponding common line for the plurality of floor units 111.

FIG. 5b shows an option for the connection of a plurality of floor units 111, 511 in a cascade arrangement, or in series. To this end, the cascade cable 513 between a first floor unit 111 and a second floor unit 511 is represented. The charging unit 110 thus requires a reduced number of connections for the floor units 111, 511. Specifically, no connecting cable 512 is required between the floor unit 511 and the charging unit 110.

The design of the charging unit 110 and of the one or more floor units 111, 511 represented in FIGS. 4, 5a and 5b is associated with numerous advantages. Specifically, DC transmission is associated with a simplification of specifications for the connecting cable 112, 512 between the charging unit 110 and the floor unit 111. For example, standard cables and standard plug connectors can be used, rather than specific HF solutions. Installation is also simplified. Moreover, the number of conductors in the cable link 112 (charging unit 110<->floor unit 111) can also be reduced by the use of alternative communication methods. In the case of PLC or WLAN, signal lines 322 can be omitted altogether. By the use of an existing communication channel between the vehicle 100 and the charging unit 110 (specifically WLAN), an additional communication unit 401 only needs to be configured in the floor unit 111, as a communication unit 301 is already present in the charging unit 301.

Moreover, the design described herein permits the simple, second, cost-effective extension of a charging station (including by retrofitting) to include a plurality of parking spaces (i.e. a plurality of floor units 111, 511). Moreover, the charging of a fleet of vehicles 100 can be organized simply, wherein vehicles 100 parked above the floor units 111, 511 can be charged in a controlled sequence by the central charging unit 110. By the use of a charging unit 110 with a higher capacity, a plurality of floor units 111, 511 can also be operated simultaneously. More rapid charging of a fleet of vehicles 100 can be achieved accordingly. For the charging station represented in FIGS. 5a, 5b, only a single mains connection is required. The central charging unit 110 distributes capacity between the connected floor units 111, 511, and thus can ensure that the mains connection is not overloaded.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A floor unit for generating an electromagnetic charging field for transmission of electrical energy to a vehicle, the floor unit comprising:
    a first interface configured to receive electrical energy in the floor unit in the form of a direct current;
    an alternating current generator configured to convert the direct current into an alternating current;
    a primary coil configured to generate the electromagnetic charging field from the alternating current;
    a sensor configured to detect measuring data with respect to a state of the floor unit; and
    a communication unit configured to transmit data, based on the measuring data, to a charging unit, wherein the charging unit is configured to deliver the electrical energy to the floor unit in the form of the direct current.

2. The floor unit according to claim 1, wherein the communication unit is as a wireless communication link to the charging unit and/or as a power line communication link to the charging unit.

3. The floor unit according to claim 1, wherein:
    the floor unit incorporates a control unit; and
    the control unit is configured to control the generation of the alternating current by the alternating current generator.

4. The floor unit according to claim 1, wherein:
    the floor unit incorporates a second interface; and
    the second interface is configured to route the electrical energy in the form of the direct current to another floor unit.

5. The floor unit according to claim 1, wherein the alternating current has a frequency of 80-90 kHz.

6. A charging unit for a charging station for wireless transmission of electrical energy to a vehicle, wherein the charging unit comprises:
    a power factor correction unit, which is adapted to electrical energy from a power supply network in order to provide a direct current; and
    a first interface configured to deliver electrical energy to a floor unit in the form of the direct current,
    wherein the charging unit comprises a communication unit configured to communicate with the vehicle and with the floor unit.

7. The charging unit according to claim 6, wherein the charging unit comprises a plurality of interfaces, which are configured to deliver the electrical energy in the form of the direct current to a corresponding plurality of floor units.

8. The charging unit according to claim 6, wherein the charging unit comprises a control unit which is configured to control transmission of the electrical energy to the vehicle via the floor unit.

9. The charging unit according to claim 6, wherein the charging unit comprises a control unit which is configured to control transmission of the electrical energy to the vehicle via the floor unit.

10. A charging station for wireless transmission of electrical energy to a vehicle, the charging station comprising:
- a charging unit configured to deliver electrical energy in the form of a direct current, the charging unit comprising a power factor correction unit adapted to receive electrical energy from a power supply network to form the direct current, and a first interface configured to deliver the direct current;
- a floor unit that generates an electromagnetic charging field for wirelessly transmitting the electrical energy to the vehicle, the floor unit comprising:
  - a first interface configured to receive the direct current from the charging unit,
  - an alternating current generator configured to convert the direct current into an alternating current,
  - a primary coil configured to generate the electromagnetic charging field from the alternating current,
  - a sensor configured to detect measuring data with respect to a state of the floor unit, and
  - a communication unit configured to transmit data, based upon the measuring data, to the charging unit; and
- a connecting cable configured to provide a galvanic connection between the first interface on the charging unit and the first interface on the floor unit.

11. The charging station according to claim 10, wherein:
the floor unit incorporates a control unit; and
the control unit is configured to control the generation of the alternating current by the alternating current generator.

12. The charging station according to claim 10, wherein:
the floor unit incorporates a second interface; and
the second interface is configured to route the electrical energy in the form of the direct current to another floor unit.

13. The charging station according to claim 10, wherein the alternating current has a frequency of 80-90 kHz.

14. The charging station according to claim 10, wherein the charging unit comprises a plurality of interfaces, which are configured to deliver the electrical energy in the form of the direct current to a corresponding plurality of floor units.

15. The charging station according to claim 14, wherein the charging unit comprises a communication unit which is configured to communicate with the vehicle and with the floor unit.

* * * * *